July 2, 1968 HANS-JOACHIM KLEMP ET AL 3,390,888

RECORDING DEVICE

Filed June 14, 1965

Inventors:
Hans-Joachim Klemp
Horst Redlich
By: Spencer & Kaye
Attorneys

United States Patent Office 3,390,888

Patented July 2, 1968

3,390,888

RECORDING DEVICE

Hans-Joachim Klemp and Horst Redlich, Berlin, Germany, assignors to Teldec Telefunken-Decca Schallplatten G.m.b.H., Hamburg, Germany Filed June 14, 1965, Ser. No. 463,685
Claims priority, application Germany, June 16, 1964, T 26,387
3 Claims. (Cl. 274—46)

ABSTRACT OF THE DISCLOSURE

A groove cutting stylus arrangement is provided for a stylus sound recording in the hill-and-dale track or in a sound track having hill-and-dale track with two components, wherein the portion of the system which holds the cutting stylus is arranged to be movable in a plane which is at right angles to the surface of the record carrier. The tangent to the circular record groove passing through the stylus tip is located in this plane as is the axis of the cutting stylus. The axis of movement of the cutting head is at a compensating angle relative to the normal of the planar surface of the record. This angle is so chosen that it compensates for the distortion caused during playback by a reproducing unit having a sound track deviation angle of considerable size. The axis of the holder of the cutting stylus, in accordance with the invention, is inclined in the same plane and at the same compensating angle relative to the direction of motion to the system so as to substantially coincide with the normal to the surface of the record.

In a preferred embodiment the stylus proper is provided at its front cutting surface with an even cut surface which is substantially parallel to its axis. The cutting stylus proper thus corresponds to the standard stylus so as to eliminate difficulties in stocking and regrinding.

The present invention relates generally to the sound recording art, and, more particularly, to a stylus arrangement for cutting a groove for sound recording wherein vertical recording producing a hill-and-dale track is provided or in a sound track of the type which has a hill-and-dale component, for example, in the two-component track for the simultaneous recording of two interrelated stereophonic signals in a single groove.

Usually, for this purpose, a groove cutting stylus arrangement is used wherein the movable part of the system carries the stylus proper and is disposed to move in a direction at right angles to the surface of the record for producing the hill-and-dale track component. Because of the movements which are at right angles to the surface of the record carrier, the wedge shaped cutting edge of the cutting stylus penetrates at continuously varying depths into the record to produce a groove-like sound track. The undulations of the sound track which are at right angles to the surface of the record correspond to the amplitudes of the electrical signals which are to be recorded. Thus, the sound tracks are produced by stylus movements which are at right angles to the surface of the record. When playing back from these sound tracks, distortions are caused if the direction of movement for the hill-and-dale track component of the pick-up device is not quite at right angles to the surface of the record. In many conventional pick-ups of playback devices, this is the case, i.e., they have a so-called sound track deviation angle for the hill-and-dale track pick-up.

In known arrangements, in order to decrease reproduction distortions because of the track deviation angle of the pick-up, the groove cutting stylus is inclined in a direction which substantially corresponds with the track deviation angle to provide a distortion to the sound track which is formed in the record. However, when this is done, it is necessary that a specially formed stylus proper be utilized which renders the stocking and regrinding of stylus points on normal machines more difficult. This is particularly the case if recordings with various compensating angles need be used.

With this in mind, it is a main object of the present invention to remove the above-mentioned difficulties and render it possible to use a normal cutting stylus for all groove cutting styli regardless of whether they operate with a finite compensating angle or not.

Another object of the present invention is to avoid the difficulties encountered with the prior art in a simple manner.

These objects and others ancillary thereto are accomplished in accordance with preferred embodiments of the invention wherein a normal stylus is used. However, the stylus is mounted in a stylus holder which has an angle formed therein so that the axis of the cutting head itself can correspond to the compensating angle and at the same time the stylus can be held at a right angle to the surface of the record.

Additional objects and advantages of the present invention will become apparent upon consideration of the following description when taken in conjunction with the accompanying drawings in which.

Figures 2, 3A, 3B:
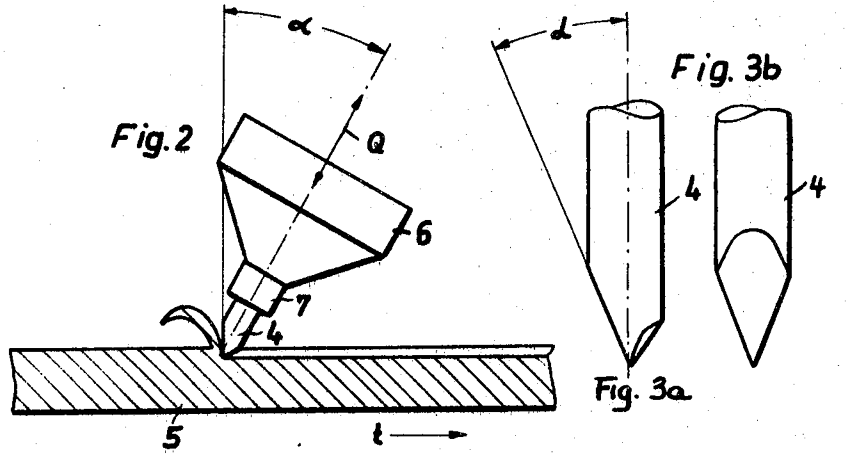
FIGURE 2 is a schematic side view of a known cutting head arrangement.

FIGURES 3*a* and 3*b* are enlarged side and front views, respectively, of the special cutting stylus which must be used with the cutting head of FIGURE 2.

Figures 4, 5A, 5B:
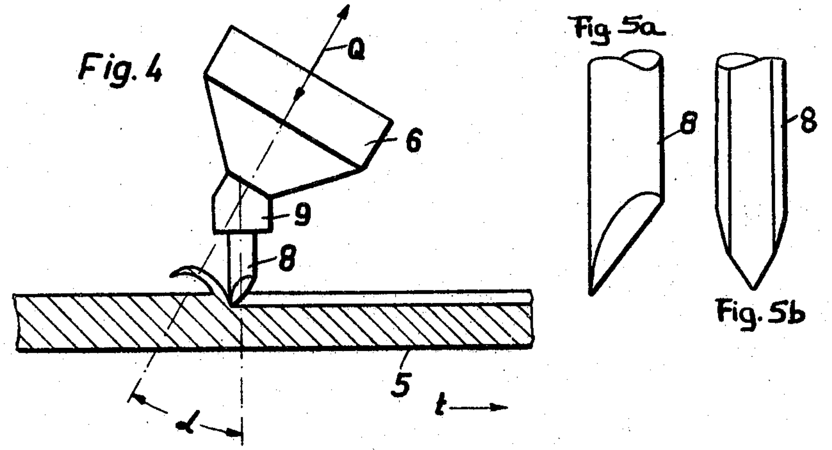

FIGURE 4 is a schematic view of a cutting head arranged in accordance with the present invention.

FIGURES 5*a* and 5*b* are a side view and front view, respectively, of the conventional stylus which can be used with the embodiment of the present invention shown in FIGURE 4.

Figure 1:
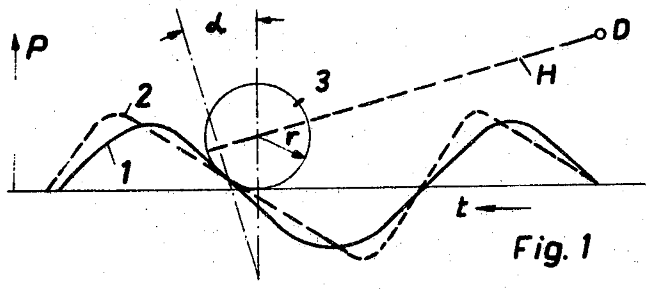
FIGURE 1 is a schematic view graphically indicating how the track deviation angle is produced.

With more particular reference to the drawings, FIGURE 1 illustrates the geometric relationships and indicates how the track deviation angle is caused. It can be assumed that the solid line forming the curve is a vertical cross section through a sound groove which, however, is assumed to be linear (in practice, these are usually circular since they are formed in a record disc). The sectional plane is considered as passing through the center of the grooves and at a right angle to the record. The longitudinal direction of the groove is designated *t* and extends in the abscissa direction of the graph and at the same time can be considered the time axis. The record moves in the direction of this time axis at a constant speed relative to the stylus tip. In the ordinate direction P the groove depth and the corresponding depth deflection of a pick-up needle are shown. The solid line curve 1 represents the bottom of the grooves upon the recording of a tone having a pure sine wave and with the recording performed without distortion. Thus, below the curve 1 there is the uncut material which is removed by the cutting stylus had been above the curve 1.

It is assumed that the undistorted sine wave 1 is scanned or sensed by a pick-up stylus having a point which is a half ball or hemisphere with the radius $r$. This is indicated in FIGURE 1 where the ball tip 3 having the radius $r$ rides on the sine curve.

In the pick-up for the reproduction of the sound recorded on records, it is not generally possible to provide for the mounting of the movable portion of the system for guidance at right angles to the surface of the record carrier as can be done in groove cutting stylus arrangements. What are used are mounting devices on springs wherein one end of the spring is fixed on an arm the end of which is rotatably disposed in a rubber bearing. In FIGURE 1, the principle of such mounting has been symbolized by the rigid connection of the movable part of the system with a holding arm H. The end of this arm which faces away from the cutting stylus can be disposed in an axis of rotation D which is parallel to the plane of movement of the pick-up stylus and to the surface of the record.

Because of construction problems, this axis of rotation can not be disposed on or in the plane of the surface of the record, and it is consequently at a certain distance from the surface of the record. The geometry of the playback arrangement is such that when the ball 3 rides on the curve and is mounted on the arm H which can be rotated about the axis of rotation D, then the up-and-down movements of ball 3 do not occur in a direction which is at right angles to the surface of the record but rather in a direction which is at right angles to the line which connects the center of the ball 3 with the axis of rotation D. Therefore, the track deviation angle $\alpha$ of the pick-up results as shown in FIGURE 1.

It is known that in order to decrease the playback distortion due to this track deviation angle of the playback apparatus, the sound track which contains the hill-and-dale components is distorted when it is recorded. This can be accomplished in a simple manner by inclining the groove cutting stylus in the direction which corresponds to the hill-and-dale sound track at an angle $\alpha$ relative to the normal to the surface of the record. When determining this angle deviation from the normal, the resilience of the material of the record also must be taken into consideration. This causes the required angle deviation from the normal to the surface of the record to be slightly increased.

With more particular reference to FIGURE 2, a conventional arrangement for producing a sound groove with a hill-and-dale component is shown. In this arrangement, the movable portion of the system of the groove cutter is inclined with respect to the normal of the surface of the record 5 and the amount of the inclination is the track deviation angle $\alpha$. The movements of the movable portion of this system which corresponds to the hill-and-dale component are then performed in the direction of the double arrow Q. It has been assumed that this is a groove cutting stylus which is dynamically driven by means of the moving coil 6. The stylus holder 7 is carried at the lower end of the movable portion of the groove cutting system and the cutting stylus 4 is, in a conventional manner, mounted in this holding device. The record 5 moves in the direction of time axis $t$ when a recording is to be produced and this motion is relative to the cutting stylus 4.

In the practical application of this type of arrangement it is necessary to use a cutting stylus having an unusual cut surface in order to produce more favorable cutting conditions. This cutting stylus does not, as does the usual type, have a cutting surface at its front cutting face which is parallel to the axial direction of the cutting stylus and the stylus holder; but, on the contrary, the cutting front of this stylus has to be inclined relative to the axis of the cutting stylus with the inclination being at the angle $\alpha$ corresponding to the angle of inclination of the groove cutter. Such a cutting stylus is shown in FIGURES 3*a* and 3*b*. The use of such an unusual cutting stylus makes stocking and regrinding of the stylus points more difficult on normal machines and it is therefore not desired to use such unusual stylus points, particularly when recordings are made having different compensating angles $\alpha$.

With more particular reference to FIGURE 4, an embodiment of the present invention is illustrated in which the movable portion of the system for the groove-cutting stylus is driven by a moving coil 6 in the direction of double arrow Q. The direction of motion is thus at an angle $\alpha$ to the normal to the surface of the record. The axis for the stylus holder 9 is inclined at the same angle $\alpha$ relative to the direction of motion but in the opposite direction. Thus, the axis of the stylus holder 9 substantially coincides with the normal to the surface of the record 5. This renders it possible for the cutting stylus 8 to be provided with a normally cut surface at its forward cutting portions. FIGURES 5*a* and 5*b* show a groove cutting stylus which can be used with the arrangement of FIGURE 4.

Thus, it can be seen that there has been provided a groove cutting stylus arrangement for a stylus sound recording in the hill-and-dale track or in a sound track having hill-and-dale track with two components, wherein the portion of the system which holds the cutting stylus is arranged to be movable in a plane which is at right angles to the surface of the record carrier. The tangent to the circular record groove passing through the stylus tip is located in this plane as is the axis of the cutting stylus. The axis of movement of the cutting head is at a compensating angle relative to the normal of the planar surface of the record. This angle is so chosen that it compensates for the distortion caused during playback by a reproducing unit having a sound track deviation angle of considerable size. The axis of the holder of the cutting stylus, in accordance with the invention, is inclined in the same plane and at the same compensating angle relative to the direction of motion to the system so as to, at least approximately, coincide with the normal to the surface of the record.

In a preferred embodiment of the invention, the stylus proper is provided at its front cutting surface with an even cut surface which is substantially parallel to its axis. The cutting stylus proper thus corresponds to the standard stylus so as to eliminate difficulties in stocking and regrinding.

It will be understood that the above description of the present invention is susceptible to various modifications, changes and adaptations, and the same are intended to be comprehended within the meaning and range of equivalents of the appended claims.

What is claimed is:

1. In a groove cutting stylus system for sound recording in hill-and-dale track on a record or in a sound track containing a hill-and-dale track such as a two component track wherein the portion of the system which carries the cutting stylus is arranged for movement in a plane which is at right angle to the surface of the record and in which plane is disposed the tangent to the groove passing through the tip of the cutting stylus and at a compensating angle relative to the normal to the planar surface of the record which is such that it compensates at least partly for the playback distortion of the recording caused by a pick up unit having a substantial sound track deviation angle, the improvement comprising a stylus holder inclined in the same plane and at the same compensating angle relative to the direction of motion of the system so that it substantially coincides with the normal to the planar surface of the record.

2. A groove cutting assembly for records, comprising, in combination:

a movable system part for holding a stylus;

means mounting said part for movement in a plane at a right angle to the surface of the record and in which plane is disposed the tangent to the groove passing through the tip of said stylus and at a compensating angle relative to the normal to the planar surface of the record which is such that it at least partly compensates for playback distortion of the recording caused by a pick up unit having a substantial sound track deviation angle; and a stylus holder mounted on said part for holding a stylus inclined in the same plane and at the same compensating angle relative to the direction of motion of the assembly so that it substantially coincides with the normal to the planar surface of the record.

3. An assembly as defined in claim 2 comprising a stylus in said holder and provided at its cutting front with an even surface which is substantially parallel to the axis of the stylus.

References Cited

B. B. Bauer, "Vertical Tracking Improvements in Stereo Recording," Audio Magazine, vol. 47, pp. 19, 20 and 46, February 1963.

LEONARD FORMAN, *Primary Examiner.*

F. J. D'AMBROSIO, *Assistant Examiner.*